(12) United States Patent
Fewkes et al.

(10) Patent No.: US 6,584,263 B2
(45) Date of Patent: Jun. 24, 2003

(54) OPTICAL FIBER COATING COMPOSITIONS AND COATED OPTICAL FIBERS

(75) Inventors: Edward J. Fewkes, Horseheads, NY (US); Inna I. Kouzmina, Corning, NY (US); Huan-Hung Sheng, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/024,271

(22) Filed: Dec. 17, 2001

(65) Prior Publication Data

US 2002/0102086 A1 Aug. 1, 2002

Related U.S. Application Data

(63) Continuation-in-part of application No. 09/722,895, filed on Nov. 27, 2000.
(60) Provisional application No. 60/220,919, filed on Jul. 26, 2000.

(51) Int. Cl.[7] .............................. G02B 6/02; C08F 2/48
(52) U.S. Cl. .................... 385/128; 385/141; 522/64; 528/70
(58) Field of Search ................................. 385/122–133, 385/147

(56) References Cited

U.S. PATENT DOCUMENTS

| | | | |
|---|---|---|---|
| 4,147,407 A | 4/1979 | Eichenbaum et al. | |
| 4,474,830 A | 10/1984 | Taylor | |
| 4,486,212 A | 12/1984 | Berkey | |
| 4,492,428 A | 1/1985 | Levy | |

(List continued on next page.)

FOREIGN PATENT DOCUMENTS

| | | |
|---|---|---|
| EP | 0311186 A1 | 12/1989 |
| EP | 0530715 A1 | 10/1993 |
| EP | 0874012 A1 | 10/1998 |
| WO | WO 96/28396 | 9/1996 |
| WO | WO99/10443 | 3/1999 |

OTHER PUBLICATIONS

Midwinter, *Optical Fibers for Transmission*, New York, John Wiley, pp. 166–178 (1979).
Blankenship et al., "The Outside Vapor Deposition Method of Fabricating Optical Waveguide Fibers", *IEEE J. Quantum Electron.*, 18:1418–1423 (1982).
Inada, "Recent Progress in Fiber Fabrication Techniques by Vapor–phase Axial Deposition", *IEEE J. Quantum Electron.* 18:1424–1431 (1982).
Nagel et al., "An Overview of the Modified Chemical Vapor Deposition (MCVD) Process and Performance", *IEEE J. Quantum Electron.* 18:459–476 (1982).
American Society for Testing and Materials, "Standard Test Method for Tensile Properties of Thin Plastic Sheeting", Designation D 882–97, pp. 1–9.

*Primary Examiner*—Akm E. Ullah
(74) *Attorney, Agent, or Firm*—James V. Suggs; Timothy R. Krogh

(57) ABSTRACT

One aspect of the present invention relates to an optical fiber coating compositions having, when cured, a Young's modulus of greater than about 950 MPa and a film to film coefficient of friction of less than about 0.44. Another aspect of the present invention relates to an coated optical fiber having a coating having a modulus of greater than about 950 MPa and a fiber to fiber coefficient of friction of less than about 0.74 measured at a speed of about 0.423 cm/sec and with a weight of about 100 grams. The coatings may include additives such as surfactants, surface agents, slip additives, waxes, and micronized polytetrafluoroethylene. The coated optical fibers of the present invention can be freely and smoothly wound on a spool without the formation of fiber loops, crossovers, or other defects.

25 Claims, 6 Drawing Sheets

U.S. PATENT DOCUMENTS

| | | |
|---|---|---|
| 4,581,165 A | 4/1986 | Frank et al. |
| 4,608,409 A | 8/1986 | Coady et al. |
| 4,609,718 A | 9/1986 | Bishop et al. |
| 4,691,989 A | 9/1987 | Blyler, Jr. |
| 4,702,554 A | 10/1987 | Takahashi et al. |
| 4,720,529 A | 1/1988 | Kimura et al. |
| 4,752,112 A | 6/1988 | Mayr |
| 4,962,992 A | 10/1990 | Chapin et al. |
| 5,104,433 A | 4/1992 | Chapin et al. |
| 5,112,658 A | 5/1992 | Skutnik et al. |
| 5,139,872 A | 8/1992 | Lapin et al. ............... 428/375 |
| 5,146,531 A | 9/1992 | Shustack |
| 5,259,060 A | 11/1993 | Edward et al. |
| 5,352,712 A | 10/1994 | Shustack |
| 5,422,182 A | 6/1995 | Oishi et al. |
| 5,486,378 A | 1/1996 | Oestreich et al. |
| 5,536,529 A | 7/1996 | Shustack |
| 5,567,794 A | 10/1996 | Barraud et al. ............... 528/70 |
| 5,664,041 A | 9/1997 | Szum |
| 5,721,800 A | 2/1998 | Kato et al. |
| 5,787,218 A | 7/1998 | Ohtaka et al. |
| 5,804,311 A | 9/1998 | Suwa et al. |
| 5,835,655 A | 11/1998 | Liu et al. |
| 5,835,656 A | 11/1998 | Oishi et al. |
| 5,837,750 A | 11/1998 | Szum et al. |
| 5,852,701 A | 12/1998 | Kato et al. |
| 5,887,104 A | 3/1999 | Sugizaki et al. |
| 5,908,873 A | 6/1999 | Shustack |
| 5,935,651 A | 8/1999 | Klocek et al. |
| 5,935,673 A | 8/1999 | Mueller |
| 5,986,018 A | 11/1999 | Yamaguchi et al. |
| 6,004,675 A | 12/1999 | Akasaka et al. |
| 6,014,488 A | 1/2000 | Shustack |
| 6,022,585 A | 2/2000 | Bourhis et al. |
| 6,054,537 A | 4/2000 | Shimizu et al. |
| 6,072,929 A | 6/2000 | Kato et al. |
| 6,110,593 A | 8/2000 | Szum et al. |
| 6,136,880 A * | 10/2000 | Snowwhite et al. ........ 428/378 |
| 6,169,126 B1 | 1/2001 | Szum et al. |
| 6,298,189 B1 * | 10/2001 | Szum et al. ................ 385/128 |
| 6,339,666 B2 * | 1/2002 | Szum et al. ................ 385/128 |
| 6,359,025 B1 * | 3/2002 | Snowwhite et al. ........ 522/120 |

* cited by examiner

Fiber attaches to load cell mounted on movable platform — 64

62

60

Movable optical fiber

90° contact angle between stationary and movable fibers

66

60

62

70

Tape

68

OPTICAL FIBER COATING COMPOSITIONS AND COATED OPTICAL FIBERS

CROSS-REFERENCE TO RELATED APPLICATIONS

This is application is a continuation-in-part of and claims the benefit of U.S. patent application Ser. No. 09/722,895 filed on or about Nov. 27, 2000 now pending and any parent application thereof, the content of which is relied upon and incorporated herein by reference in its entirety, and the benefit of priority under 35 U.S.C. §120 is hereby claimed i.e., an application of U.S. provisional application 60/220,919, filed on July 26, 2000.

FIELD OF THE INVENTION

The present invention relates to compositions for optical fiber coatings and fiber optic ribbon matrixes, optical fibers that contain a secondary coating prepared from such compositions, methods of making such optical fibers, and fiber optic ribbons that contain a matrix prepared from such compositions.

BACKGROUND OF THE INVENTION

Optical fibers have acquired an increasingly important role in the field of communications, frequently replacing existing copper wires. This trend has had a significant impact in the local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business environments for internal data, voice, and video communications has begun and is expected to increase.

Optical fibers typically contain a glass core and at least two coatings, e.g., a primary (or inner) coating and a secondary (or outer) coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled. The secondary coating is applied over the primary coating and functions as a tough, protective outer layer that prevents damage to the glass fiber during processing and use.

Certain characteristics are desirable for the secondary coating. Before curing, the secondary coating composition should have a suitable viscosity and be capable of curing quickly to enable processing of the optical fiber. After curing, the secondary coating should have the following characteristics: sufficient stiffness to protect the encapsulated glass fiber yet enough flexibility for handling (i.e., modulus), low water absorption, low tackiness to enable handling of the optical fiber, chemical resistance, and sufficient adhesion to the primary coating.

To achieve the desired characteristics, conventional secondary coating compositions generally contain urethane-based oligomers in large concentration, with monomers being introduced into the secondary coating composition as reactive diluents to lower the viscosity. Because conventional oligomeric components are, in general, much more expensive than the monomeric components, the use of oligomers in high concentration has the effect of increasing the cost of producing secondary coating compositions as well as the resulting optical fiber. Despite the cost of using oligomeric components in high concentration, it is believed that there are no commercially viable secondary coating compositions that either contain a low concentration or are completely devoid of oligomeric components.

Thus, there remains a need for suitable secondary coating compositions which can be prepared at lower cost than conventional secondary coating compositions and yield secondary coatings with a suitable modulus and other physical properties. The present invention is directed to overcoming this deficiency in the art.

There is also a need for a coating that will reduce the sensitivity of the fiber to bending, particularly microbending. This is especially relevant for high data rate optical fiber. A high data rate fiber is typically a single mode fiber with a large effective area. Fibers with a large effective area have an increased signal mode transmission capacity in comparison to non-large effective area fibers. However, fibers with a large effective area have a greater sensitivity to stresses, such as stresses caused by bending the fiber. These stresses can lead to distortion of the optically active region of the fiber and result in microbend signal attenuation.

SUMMARY OF THE INVENTION

The present invention relates to a composition for coating optical fibers and optical fiber coated with the composition. One aspect of the invention comprises an optical fiber coating composition. The coating composition comprises an UV curable composition and when cured exhibits a Young's modulus of about 950 MPa or more and a film to film coefficient of friction of less than about 0.44. A second aspect of the invention comprises an optical fiber having a core and a cladding coated with the aforementioned coating.

A third aspect of the invention comprises a coated optical fiber comprising an optical fiber having a core and a cladding, and a coating composition and when cured the coating exhibits a Young's modulus of at least about 950 MPa or more and a fiber to fiber coefficient of friction of no more than about 0.74. Preferably the fiber to fiber coefficient of friction is measured at a speed of about 0.423 cm/sec and with a weight of about 100 grams.

The composition of the present invention has suitable characteristics which enable its use in preparing the outer coating material on optical fibers and the matrix material on fiber optic ribbons. Moreover, when cured, the composition results in a coating or matrix material that possesses desirable characteristics with respect to water absorption, reduced microbend sensitivity, and extraction, as well as strength or modulus. Thus, suitable coating or matrix materials can be prepared from a composition that contains little or no oligomeric components, which significantly reduces the cost of preparing such compositions as well as the optical fibers and fiber optic ribbons that contain the cured product of such compositions.

An optical fiber coated with the inventive UV curable composition has the advantage of exhibiting reduced "slip-stick" behavior to desirable levels, preferably eliminating slip-stick, without compromising the mechanical properties of the coated fiber. "Slip-stick" behavior includes at least when a fiber is either being wound onto a spool or paid off of a spool and the coated fiber repeatedly sticks to the adjacent fiber below the fiber and then slips over the adjacent fiber below and then sticks again. "Slip-stick" behavior is further described below with respect to FIG. 3.

A fiber coated with the inventive UV curable coating composition has also exhibited desirable optical time domain reflectometry ("OTDR") results. The favorable OTDR results include desirable wind-induced attenuation results. Favorable wind-induced attenuation results correlate to a fiber with improved handability in the rewinding, ribboning, and cabling processes.

Another advantage of the inventive composition is that the composition minimizes, preferably eliminates, the "blooming effect" of uncured coating components, such as a monomer, or unreacted coating components. An example of the blooming effect is when a monomer or other coating component migrates to the coating surface. One reason for blooming effect is the migration of non-fully cured components which migrate or result on the surface of the optical fiber coating.

Preferably the inventive coating protects the fiber from handling and environmental abuse. Preferably, the inventive minimizes wind-induced attenuation.

DETAILED DESCRIPTION OF THE INVENTION

Figure 1:
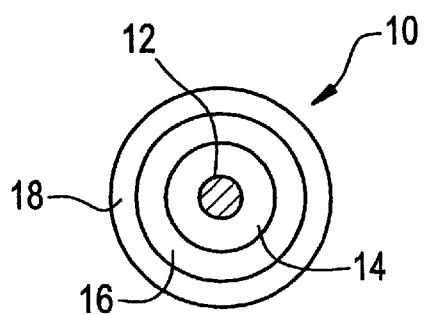
FIG. 1 is a cross-sectional view of an optical fiber of the present invention.

The present invention relates to a composition for coating optical fibers. It is preferred that the inventive composition is an UV curable composition and not a thermoplastic composition. In one embodiment of the invention, the composition of the present invention includes an oligomeric component present in an amount of about 15 weight percent or less and a monomeric component present in an amount of about 75 weight percent or more. After curing, the cured product of the composition is characterized by a Young's modulus of at least about 950 MPa, more preferably about 1000 MPa. It is preferred that the inventive composition has a film to film coefficient of friction of about 0.44 or less or a fiber to fiber coefficient of friction of about 0.74 or less. Because of its physical characteristics, particularly its relatively high strength, the composition of the present invention is particularly suitable for use in preparing a secondary or outer coating of an optical fiber or a matrix of a fiber optic ribbon. The invention herein is not limited to an UV coating composition which comprises 15% or less of an oligomeric component. The inventive composition may include an oligomeric component of more than about 15%.

As used herein, the weight percent of a particular component refers to the amount introduced into the bulk composition, excluding other additives. The amount of other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of an additive, for example 1.0 part per hundred of an antioxidant, is introduced in excess of the 100 weight percent of the bulk composition.

Because of substantial cost savings in reducing the oligomer content of optical fiber coating compositions, the major constituent of the composition of the present invention is the monomeric component and the minor constituent is the oligomeric component. This is contrary to most conventional secondary coating and/or matrix compositions, which contain an oligomeric component as the major constituent and a monomeric component as the minor constituent. In most conventional coating and/or matrix compositions, the oligomeric component typically functions as the backbone upon which polymerization occurs while the monomeric component functions as a diluent for controlling the viscosity of the composition and, during curing, as a cross-linking agent (depending upon the number of functional groups a particular monomeric constituent may have).

In the composition of the present invention, the monomeric component can include a single monomer or it can be a combination of two or more monomers. Although not required, it is preferable that the monomeric component be a combination of two or more monomers when the composition is substantially devoid of the oligomeric component. Preferably, the monomeric component introduced into the composition of the present invention comprises ethylenically unsaturated monomer(s). While the monomeric component can be present in an amount of 75 weight percent or more, it is preferably present in an amount of about 75 to about 99.2 weight percent, more preferably about 80 to about 99 weight percent, and most preferably about 85 to about 98 weight percent.

Ethylenically unsaturated monomers may contain various functional groups which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Henkel Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Henkel Corp., and SR499, Sartomer Company, Inc.), propoxylated trimethylolpropane triacrylate with propoxylation being 3 or greater, preferably ranging from 3 to 30 (e.g., Photomer 4072, Henkel Corp. and SR492, Sartomer), and ditrimethylolpropane tetraacrylate (e.g., Photomer 4355, Henkel Corp.); alkoxylated glyceryl triacrylates such as propoxylated glyceryl triacrylate with propoxylation being 3 or greater (e.g., Photomer 4096, Henkel Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Henkel Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether (4 up) and the like (e.g., Photomer 3016, Henkel Corp.); and single and multi-ring cyclic aromatic or non-aromatic polyacrylates such as dicyclopentadiene diacrylate and dicyclopentane diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g., SR423, Sartomer Company, Inc.), tetrahydrofurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, Henkel Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

Most suitable monomers are either commercially available or readily synthesized using reaction schemes known in the art. For example, most of the above-listed monofunctional monomers can be synthesized by reacting an appropriate alcohol or amide with an acrylic acid or acryloyl chloride.

As indicated above, the minor constituent of the coating composition of the present invention is the oligomeric component. The oligomeric component can include a single type of oligomer or it can be a combination of two or more oligomers. When employed, if at all, the oligomeric component introduced into the compositions of the present invention preferably comprises ethylenically unsaturated oligomers. While the oligomeric component can be present in an amount of 15 weight percent or less, it is preferably present in an amount of about 13 weight percent or less, more preferably about 10 weight percent or less. Optionally while maintaining suitable physical characteristics of the composition and its resulting cured material, it is more cost-effective and, therefore, desirable to prepare compositions containing preferably less than about 5 weight percent or substantially devoid of the oligomeric component.

When employed, suitable oligomers can be either monofunctional oligomers or polyfunctional oligomers, although polyfunctional oligomers are preferred. The oligomeric component can also be a combination of a monofunctional oligomer and a polyfunctional oligomer.

Di-functional oligomers preferably have a structure according to formula (I) below:

$$F_1—R_1-[\text{Diisocyanate-}R_2\text{-Diisocyanate}]_m—R_1—F_1 \qquad (I)$$

where $F_1$ is independently a reactive functional group such as acrylate, methacrylate, acrylamide, N-vinyl amide, styrene, vinyl ether, vinyl ester, or other functional group known in the art; $R_1$ includes, independently, $—C_{2-12}O—$, $—(C_{2-4}—O)_n—$, $—C_{2-12}O—(C_{2-4}—O)_n—$, $—C_{2-12}O—(CO—C_{2-5}O)_n—$, or $—C_{2-12}O—(CO—C_{2-5}NH)_n—$ where n is a whole number from 1 to 30, preferably 1 to 10; $R_2$ is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to $R_2$ and/or $R_1$. The term "independently" is used herein to indicate that each $F_1$ may differ from another $F_1$ and the same is true for each $R_1$.

Other polyfunctional oligomers preferably have a structure according to formula (II), formula (III), or formula (IV) as set forth below:

$$\text{multiisocyanate-}(R_2—R_1—F_2)_x \qquad (II)$$

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from about 2–250 carbon atoms and, preferably, are substantially free of ether or ester groups.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

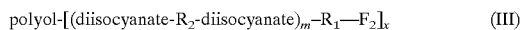

polyol-[(diisocyanate-$R_2$-diisocyanate)$_m$–$R_1$—$F_2$]$_x$  (III)

or

multiisocyanate-($R_1$—$F_2$)$_x$  (IV)

where $F_2$ independently represents from 1 to 3 functional groups such as acrylate, methacrylate, acrylamide, N-vinyl amide, styrene, vinyl ether, vinyl ester, or other functional groups known in the art; $R_1$ can include —$C_{2-12}O$—, —($C_{2-4}$—O)$_n$—, —$C_{2-12}O$—($C_{2-4}$—O)$_n$—, —$C_{2-12}O$—(CO—$C_{2-5}O$)$_n$—, or —$C_{2-12}O$—(CO—$C_{2-5}NH$)$_n$— where n is a whole number from 1 to 10, preferably 1 to 5; $R_2$ can be polyether, polyester, polycarbonate, polyamide, polyurethane, polyurea or combinations thereof; x is a whole number from 1 to 10, preferably 2 to 5; and m is a whole number from 1 to 10, preferably 1 to 5. In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

Urethane oligomers are conventionally provided by reacting an aliphatic diisocyanate with a dihydric polyether or polyester, most typically a polyoxyalkylene glycol such as a polyethylene glycol. Such oligomers typically have between about four to about ten urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., which are hereby incorporated by reference, describe such syntheses in detail.

As is well known, optical fiber coating compositions may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thicknesses of about 25–35 μm is, e.g., less than 1.0 J/cm$^2$, preferably less than 0.5 J/cm$^2$.

Suitable photoinitiators include, without limitation, 1-hydroxycyclohexylphenyl ketone (e.g., Irgacure 184 available from Ciba Specialty Chemical (Tarrytown, N.Y.)), (2,6-dimethoxybenzoyl)-2,4,4-trimethylpentyl phosphine oxide (e.g., in commercial blends Irgacure 1800, 1850, and 1700, Ciba Specialty Chemical), 2,2-dimethoxyl-2-phenyl acetophenone (e.g., Irgacure 651, Ciba Specialty Chemical), bis(2,4,6-trimethylbenzoyl)phenyl phosphine oxide (e.g., Irgacure 819, Ciba Specialty Chemical), (2,4,6-trimethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical) and combinations thereof. Other photoinitiators are continually being developed and used in coating compositions on glass fibers. Any suitable photoinitiator can be introduced into compositions of the present invention.

In addition to the above-described components, the secondary coating composition of the present invention can optionally include an additive or a combination of additives. Suitable additives include, without limitation, antioxidants, catalysts, lubricants (e.g. plasticizers), low molecular weight non-crosslinking resins, adhesion promoters, dyes, pigments, and rheological modifiers (e.g. tackifiers) and stabilizers (light, thermal, or color). Some additives can operate to control the polymerization process, thereby affecting the physical properties (e.g., modulus, glass transition temperature) of the polymerization product formed from the composition. Others can affect the integrity of the polymerization product of the composition (e.g., protect against de-polymerization or oxidative degradation).

A non-exhaustive list of optional preferred additives includes surfactants, surface agents, slip additives, waxes, micronized-polytetrafluoroethylene (hereinafter "micronized-PTFE"), polyol, and combinations thereof. Preferably a surfactant comprises a compound which includes one or more polar sections and one or more non-polar sections. A surfactant is not limited to only a compound which modifies surface conditions. Preferably a surface agent is a particular type of surfactant which may be used to modify surface conditions. Preferably, the polyol has a molecular weight of at least about 4000 to about 9000 Daltons, more preferably about 4000 to about 8000 Daltons. One example of a preferred polyol comprises a multi-atom alcohol with a repeating alkoxy unit.

Examples of preferred tackifiers are those classified as a terpene base resin, coumarone base resin, petroleum resin, hydrogenated petroleum resin, styrene resin, phenol resins, or rosin base resin. It is preferred that the tackifiers are nonepoxidized. The rosin base resins include unmodified rosin (e.g., wood, gum, or tall oil) and rosin derivatives. Rosin base resins can be classified by their rosin acids, which are either an abietic acid or a pimaric acid. Abietic acid type rosins are preferred. Rosin derivatives include polymerized rosin, disproportionated rosin, hydrogenated rosin, and esterified rosin. Representative examples of such rosin derivatives include pentaerythritol esters of tall oil, gum rosin, wood rosin, or mixtures thereof.

A more preferred additive comprises a polymer based on a polyalkylsiloxane. The aforementioned additives may be present in the coating composition up to about 2.0 weight percent, preferably up to about 1.0 weight percent, more preferably up to about 0.75 weight percent, even more preferably up to about 0.50 weight percent, and most preferably at least about 0.25 weight percent. Preferred commercial embodiments of the aforementioned optional additives include Tegorad 435, Tegorad 2200, Polyol 8200 (available from Lyondell of Newton Square, Pa. (derived from a polypropylene glycol) or under the Acclaim tradename from Bayer AG), Polyol 4200 (available from Lyondell of Newtown Square, Pa. (derived from a polypropylene glycol) or under the Acclaim tradename from Bayer AG), Coatosil 3503 (acrylated siloxane copolymer from C.K. Witco Corp.), and Coatosil 3505 (siloxane copolymer without acrylate functional group from C.K. Witco Corp.).

A preferred antioxidant is thiodiethylene bis(3,5-di-tert-butyl)-4-hydroxyhydrocinnamate (e.g., Irganox 1035, available from Ciba Specialty Chemical).

A preferred adhesion promoter is an acrylated acid adhesion promoter such as Ebecryl 170 (available from UCB Radcure (Smyrna Ga.)).

Other suitable materials for use in secondary coating materials, as well as considerations related to selection of these materials, are well known in the art and are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

In one embodiment of the invention, the oligomeric component functions not as a backbone upon which polymerization occurs during curing of the compositions, but rather as a thickening agent to control viscosity of the final composition. As discussed hereinafter, preparation of optical fibers and fiber optic ribbons requires the composition of the present invention to be coated onto one or more previously coated glass fibers (i.e., using either wet-on-wet or wet-on-dry coating processes). To enable effective optical fiber and fiber optic ribbon production, the composition of the present invention should be sufficiently viscous at processing temperatures so that it remains on the coated glass fibers until it is cured. A suitable viscosity for the composition of the present invention is between about 250 and about 2500 centipoise at 45° C., preferably between about 300 and about 2000 centipoise at 45° C., more preferably between about 350 and about 1500 centipoise at 45° C. A preferred composition of the present invention contains about 10 weight percent of BR-301, a polyether urethane acrylate oligomer available from Bomar Specialty Chemical (Winsted, Conn.); about 22 weight percent of Photomer 4025, an ethoxylated (8) bisphenol A diacrylate monomer available from Henkel; about 65 weight percent of Photomer 4028, an ethoxylated (4) bisphenol A diacrylate monomer available from Henkel; and about 3 weight percent of Irgacure 1850 photoinitiator, a commercial blend containing bis (2,6-dimethoxybenzoyl)-2,4,4-trimethylpentyl phosphine oxide and 1-hydroxycyclohexyl phenyl ketone, available from Ciba Specialty Chemical.

Another preferred composition of the present invention contains about 10 weight percent of KWS 4131, a polyether urethane diacrylate oligomer available from Bomar Specialty Chemical; about 5 weight percent of Photomer 3016, an epoxy acrylate monomer available from Henkel; about 82 weight percent of Photomer 4028, an ethoxylated(4) bisphenol A diacrylate monomer available from Henkel; about 1.5 weight percent of Irgacure 819 photoinitiator, a bis(2,4,6-trimethylbenzoyl) phenyl phosphine oxide, available from Ciba Specialty Chemical; 1.5 weight percent of Irgacure 184 photoinitiator, a 1-hydroxycyclohexyl phenyl ketone, available from Ciba Specialty Chemical; and about 0.5 pph of Irgacure 1035 an antioxidant, a thiodiethylene bis(3,5-di-tert-butyl)-4-hydroxyhydrocinnamate available from Ciba Specialty Chemical. Additional embodiments of the inventive coating composition comprises 10% of KWS 4131 or 10% of BR 301 as an oligomeric component, 87% of Photomer 4028 of a monomeric component, 3% Irgacure 1850 of a photoinitiator, and 0.5 pph of Irganox 1035 of an antioxidant. A further embodiment comprises about 10% of KWS 4131, 82% of Photomer 4028, 5% of Photomer 3016, 3% of Irgacure 1850, and 0.5 pph of Irganox 1035.

Another aspect of the present invention relates to a coating or matrix material which is the cured product of a composition of the present invention.

Despite the low oligomer content of the composition of the present invention, the resulting coating or matrix material of the present invention is characterized by a high tensile strength. As measured according to ASTM D-882-97, which is hereby incorporated by reference, the tensile strength of the polymerization product of the compositions of the present invention at least about 18 MPa, preferably at least about 20 MPa, more preferably at least about 22 MPa. When measured in accordance with ASTM D-882-97, the secant modulus is at least about 350 MPa, preferably at least about 450 MPa, and more preferably at least about 550 MPa. The Young's modulus for the polymerization product of a coating composition of the present invention, when measured according to ASTM D-882-97, which is hereby incorporated by reference, is at least about 950 MPa, preferably at least about 1100 MPa, more preferably at least about 1300 MPa, even more preferably at least about 1700 MPa, and most preferably at least about 2100 MPa.

A particularly useful characteristic of the coating or matrix material of the present invention is its ability to resist water absorption, since water absorption by the coating or matrix can eventually cause delamination of the coatings from the glass fiber and/or weakening of the matrix, which may result in signal attenuation. Therefore, water absorption by the coating or matrix material of the present invention should be less than about 5 percent, preferably less than about 3 percent, more preferably less than about 2 percent.

Another useful characteristic of the coating or matrix material is its ability to resist degradation or property changes following exposure to water. Thus, it is desirable for coating or matrix materials to contain a low percentage of water-extractable components. Preferably, the coating material will contain less than about 2 percent extractable components, preferably less than about 1 percent, and more preferably less than about 0.5 percent extractable components. It is also preferred that the inventive composition has a percent elongation of less than about 30% at break. It is more preferred that the percent elongation is about 10 to about 20% at break.

The inventive coating composition has an excellent application as a coating for a large effective area optical fiber, especially for fibers for high data rate, submarine, or terrestrial applications. It is preferred that the inventive coating that is applied to the fiber has a Young's modulus of at least about 950 MPa. A waveguide (a.k.a. optical fiber) having large effective area reduces non-linear optical effects, including self phase modulation, four wave mixing, cross phase modulation, and non-linear scattering processes, which can cause degradation of signals in high power systems. In general, a mathematical description of these non-linear effects includes the ratio, $P/A_{eff}$, where P is light power. For example, a non-linear optical effect can follow an equation containing a term, $\exp[PxL_{eff}/A_{eff}]$, where $L_{eff}$ is effective length. Thus, an increase in $A_{eff}$ produces a decrease in the non-linear contribution to the degradation of a light signal propagating in the waveguide. The requirement in the telecommunication industry for greater information capacity over long distances, without regenerators, has led to a reevaluation of single mode fiber refractive index profile design.

The focus of this reevaluation has been to provide optical waveguides that reduce non-linear effects such as those noted above and are optimized for the lower attenuation operating wavelength range around 1550 nm, i.e., the range from about 1250 nm to 1700 nm. In addition the waveguide should be compatible with optical amplifiers, and, retain the desirable properties of optical waveguides now deployed, such as, high strength, fatigue resistance, and bend resistance.

A waveguide fiber having at least two distinct refractive index segments has been found to have sufficient flexibility to meet or exceed the criteria for a high performance waveguide fiber system.

The effective area of a waveguide is in general increased by designing refractive index profiles that cause the light power distribution in the fiber to be shifted outwardly from the centerline of the waveguide fiber, thus reducing the power density. In moving the power distribution outwardly toward the core edge, however, the waveguide is made more susceptible to power losses due to bending of the fiber.

Many such high performance waveguide designs are inherently more susceptible to microbend induced attenuation losses of the transmitted signal. These microbend sensitive designs require coating systems such as those of the instant invention to mitigate microbend issues.

Definitions

The following definitions are in accord with common usage in the art.

The refractive index profile is the relationship between refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile.

The effective area is $A_{eff} = 2\pi(\int E^2 r\, dr)^2/(\int E^4 r\, dr)$, where the integration limits are 0 to $\infty$, and E is the electric field associated with light propagated in the waveguide. An effective diameter, $D_{eff}$, may be defined as, $A_{eff} = \pi(D_{eff}/2)^2$.

By large effective area, we mean that the effective area of the fiber is greater than about 60 $\mu m^2$, more preferably the effective area of the fiber is greater than about 65 $\mu m^2$, and most preferably the effective area of the fiber is greater than 70 $\mu m^2$. It is possible and preferable to have a fiber with an effective area of greater than about 80 to 90 $\mu m^2$.

The relative refractive index percent, $\Delta \% = 100 \times (n_i^2 - n_c^2)/2n_i^2$, where $n_i$ is the maximum refractive index in region i, unless otherwise specified, and $n_c$ is the average refractive index of the cladding region unless otherwise specified.

The term a-profile refers to a refractive index profile, expressed in terms of $\Delta(b)\%$, where b is radius, which follows the equation, $\Delta(b) \% = \Delta(b_o)(1-[|b-b_o|/(b_f-b_o)]^\alpha)$, where $b_o$ is the point at which $\Delta(b) \%$ is maximum, $b_f$ is the point at which $\Delta(b) \%$ is zero, and b is in the range $b_i \leq b \leq b_f$, where delta is defined above, $b_i$ is the initial point of the $\alpha$-profile, $b_f$ is the final point of the $\alpha$-profile, and $\alpha$ is an exponent which is a real number. The initial and final points of the $\alpha$-profile are selected and entered into the computer model. As used herein, if an $\alpha$-profile is preceded by a step index profile or any other profile shape, the beginning point of the $\alpha$-profile is the intersection of the $\alpha$-profile and the step profile or other profile.

With respect to large effective area fibers for submarine applications, the coated fiber has demonstrated an attenuation of no more than about 0.23 dB/km at a wavelength of 1550 nm, preferably no more than about 0.22 dB/km, more preferably no more than about 0.20 dB/km, most preferably no more than about 0.15 dB/km. The cutoff wavelength of submarine fibers is typically in the range of about 1000 to about 2000 nm, preferably less than about 1600 nm, more preferably less than about 1500 nm, and most preferably less than about 1400 nm. The mode field diameter (MFD) is in the range of about 10.0 to about 7.0 $\mu m^2$, preferably about 9.7 to about 7.7 $\mu m^2$, and more preferably about 9.6 to about 8.0 $\mu m^2$. One example of a suitable submarine fiber is Submarine Leaf® available from Corning, Incorporated of Corning, N.Y., which has an effective area of about 71 $\mu m^2$.

With respect to large effective area fibers for high data rate applications, the coated fiber has demonstrated an attenuation of no more than about 0.25 dB/km at a wavelength of 1550 nm, preferably no more than about 0.22 dB/km, more preferably no more than about 0.20 dB/km, most preferably no more than about 0.19 dB/km. High data rate fibers have also demonstrated a polarization mode dispersion (PMD) of no more than about 0.05 ps/km$^{1/2}$, preferably no more than about 0.04 ps/km$^{1/2}$, more preferably no more than about 0.02 ps/km$^{1/2}$, most preferably no more than about 0.01 ps/km$^{1/2}$. The cutoff wavelength of high data rate fibers is typically in the range of about 1000 to about 2000 nm, preferably in the range of about 1500 to about 1900 nm, and more preferably in the range of about 1700 to about 1550 nm. The mode field diameter (MFD) is in the range of about 12.0 to about 8.0 $\mu m^2$, preferably about 11.0 to about 9.0 $\mu m^2$, and more preferably about 10.0 to about 9.5 $\mu m^2$. High data rate fiber can transmit information at a rate of about 1 Gbs, preferably about 2 Gbs, and more preferably about 10 Gbs.

It is further preferred that the large effective area fiber has a core radius of about 2 to about 6 $\mu m$, more preferably about 3 to about 5 $\mu m$.

Two examples of large effective area fibers which the inventive coating may be applied to include SMF-28™ and LEAF® fibers available from Corning, Incorporated of Corning, N.Y. It is preferred that SMF-28™ has a mode field diameter of at least about 9.0 $\mu m$ and a preferred change in signal attenuation @ 1550 nm and @ 70-30N of less than about 0.50 dB/m, more preferably about 0.30 dB/m or less, most preferably about 0.15 dB/m or less. The change in signal attenuation should be tested in accordance with the lateral load wire mesh test, described below in example 4. It is preferred that LEAF® has a mode field diameter of at least about 9.0 $\mu m$, more preferred at least about 9.5 $\mu m$ and a preferred change in signal attenuation @1550 nm and @ 70-30N of less than about 1.17 dB/m, more preferably about 0.80 dB/m or less, most preferably about 0.55 dB/m or less. The change in signal attenuation should be tested in accordance with the lateral load wire mesh test, described below in example 4.

Two examples of compositions that may be applied to the aforementioned SMF-28™ and LEAF® fibers include a coating which consists of about 10 weight percent of a polyether-based urethane diacrylate oligomer (e.g. BR301), about 22 weight percent of an ethoxylated(8) bisphenol A diacrylate monomer (e.g. Photomer 4025), about 65 weight percent of an ethoxylated(4) bisphenol A diacrylate monomer (e.g. Photomer 4028), about 3 weight percent of a blend of 1-hydroxycyclohexyl phenyl ketone and bis(2,6-dimethoxybenzoyl)-2,4,4-trimethylpentyl phosphine oxide (e.g. Irgacure 1850), and about 0.5 pph of an antioxidant containing thiodiethylene bis(3,5-di-tert-butyl-4-hydroxy) hydrocinnamate (e.g. Irganox 1035). The composition of the second coating includes about 10 weight percent of a polyether-based urethane diacrylate oligomer (e.g. KWS4131), about 87 weight percent of an ethoxylated(4) bisphenol A diacrylate monomer (e.g. Photomer 4028), about 3 weight percent of a blend of 1-hydroxycyclohexyl phenyl ketone and bis(2,6-dimethoxybenzoyl)-2,4,4-trimethylpentyl phosphine oxide (e.g. Irgacure 1850), and about 0.5 pph of an antioxidant containing thiodiethylene bis(3,5-di-tert-butyl-4-hydroxy)hydrocinnamate (e.g. Irganox 1035). The above noted coating compositions is not an exhaustive list of coating compositions that may be used to practice the invention.

For additional disclosure on a large effective area fiber U.S. Provisional patent applications granted Ser. Nos. 60/145,759, filed Jul. 27, 1999, and 60/165,833, filed Nov. 16, 1999, the specifications of which are incorporated herein by reference in their entirety.

Another aspect of the present invention relates to an optical fiber prepared with a composition of the present invention. Referring to FIG. 1, the optical fiber 10 includes a glass core 12, a cladding layer 14 surrounding and adjacent to the glass core 12, a primary coating material 16 which encapsulates and adheres to the cladding layer 14, and one or more secondary (or outer) coating materials 18 encapsulating the primary coating material 16.

Any conventional material can be used to form the glass core 12, such as those described in U.S. Pat. No. 4,486,212 to Berkey, which is hereby incorporated by reference. The core is typically a silica based glass having a cylindrical cross section and a diameter ranging from about 5 to about 10 $\mu$m for single-mode fibers and about 20 to about 100 $\mu$m for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

The primary coating material 16 is the polymerization product of any suitable primary coating composition. A number of suitable primary coating compositions are known in the art and others are continually being developed. Typically, such conventional primary coating compositions contain a high concentration of one or more oligomeric components (e.g., polyether urethane acrylate oligomers, polyester urethane acrylate oligomers, polyurea urethane acrylate oligomers, polyether acrylate oligomers, polyester acrylate oligomers, polyurea acrylate oligomers, epoxy acrylate oligomer, and hydrogenated polybutadiene oligomers), one or more monomeric components as reactive diluents or cross-linking agents, adhesion promoters which promote adhesion of the primary coating to the underlying glass fiber, polymerization initiators, and other known additives.

It is preferred that the primary coating is a soft coating having a low Young's modulus. Preferably, the Young's modulus of the primary coating is not more than 3.0 MPa, more preferably the Young's modulus is not more than 1.5 MPa, most preferably the Young's modulus is not more than 1.0 MPa. In the case that the secondary coating has a Young's modulus of more than about 1300 MPa, it is preferred that the primary coating includes a high molecular weight urethane acrylate oligomer (e.g. KWS6001 available from Bomar Speciality Co, Winsted, Conn.) and a caprolactone acrylate monomer (Tone M 100 available from Union Carbide Company, Danbury, Conn.). It is preferred that the caprolactone monomer is present in an amount greater than five (5) weight percent, and more preferably in an amount greater than fifteen (15) weight percent.

The secondary coating material 18 is the polymerization (i.e., cured) product of a composition of the present invention. The secondary coating material 18 can be a tight buffer coating or, alternatively, a loose tube coating. Irrespective of the type of secondary coating material employed, it is preferred that the outer surface of the secondary coating material 18 not be tacky so that adjacent convolutions of the optical fiber (i.e., on a process spool) can be unwound.

The inventors determined that the coating system may be used to manage wind induced attenuation. The coefficient of friction of a secondary coating applied to an optical fiber is a property that may be used to manage the wind induced attenuation.

It is preferred that the secondary coating has an outer surface with a coefficient of friction such that a spool of fiber can be freely and smoothly wound and rewound without causing fiber loops, fiber crossovers, or other wind defects that impart local stresses to the fiber and lead to microbend induced attenuation losses. The coefficient of friction of the secondary coating is preferably no more than about 0.44, more preferably less than about 0.40, even more preferably less than about 0.37, and most preferably less than about 0.35. It is further preferred that the film to film coefficient of friction is at least about 0.05, more preferably at least about 0.10, and most preferably at least about 0.15.

The coefficient of friction was measured in accordance with the following procedure. A coating film of about 3 inches wide and 10 inches long (hereinafter "large coating film") was cast on a large glass plate and cured by Fusion conveyor belt system (available from Fusion UV of Gaithersburg, Md.). Another coating film is cast on a 5 cm by 8 cm glass plate and cured by the same Fusion system (hereinafter "small coating film").

The Coefficient of friction (COF) of the coating was measured by a Chatillon friction tester from Kayeness Inc, Morgantown, Pa. The large coating film is put on a sliding stage of the friction tester and the small coating film is placed against the large coating film with a total load of 'W' on top of it. The total load used to determine the COF had a mass of 120 g. This small glass plate is also connected to a load cell of the tester. The sliding stage travels and carries the large film with it when the test is initiated. The sliding stage traveled at a rate of 6 inches/minute. The load cell measures the force 'F' needed for the coating films to slide over each other. The COF of the coating is calculated by the following formula: COF=F/W. The above test was conducted at a temperature of 23° C. and a relative humidity of 50%.

Preferably an optical fiber having the inventive coating has a fiber to fiber coefficient of friction of less than about 0.75, more preferably no more than about 0.74, even more preferably no more than about 0.70, and most preferably no more than about 0.64. The fiber to fiber coefficient of friction may be either a static or dynamic coefficient of friction. A static coefficient of friction is the coefficient of friction correlates to the force necessary to initiate movement of the test fiber. In other words, the static COF is an initial peak value to start fiber movement. The dynamic coefficient of friction correlates to that force that is necessary to maintain the test fiber in motion. The dynamic value can be the value recorded after the initial peak to maintain the test fiber moving in steady motion.

The procedure to measure the fiber to fiber coefficient of friction (COF) is described below. The required equipment includes: (1) a winder capable of winding fiber onto 2 inch diameter cylinders. As stated in the procedure, a foot control for starting and stopping the winder makes winding the cylinders much easier and gives a neater wind. After-market foot switches work very well if the winder does not come equipped with such.; (2) metal cylinders, preferably aluminum, are used to hold the fiber in this test. These cylinders are 2 inches in diameter and 2 inches in length. The center of the cylinder is bored and tapped for ¼'-20 threads to the inch as a means of holding the cylinder during winding of fiber onto the cylinder and as a means of holding the cylinder during the friction testing. Any metal which can be turned on a lathe and tapped for threads should be acceptable in this test. The surface finish on the cylinders is not critical as the fiber tension holds the stationary fiber in place when fiber is wound onto the cylinder.; (3) Test apparatus used should be capable of:

a) holding the cylinder wound with fiber such that the moving fiber can be pulled across the wound fiber parallel to the wound fiber axis
 b) pulling the moving fiber at a constant speed of 0.423 cm/sec and
 c) measuring the force required to pull the moving fiber across the stationary fiber
 d) recording the force during the duration of the test
 e) optionally, the apparatus will contain a computer which is capable of determining the peak and average forces
 f) optionally, the computer is hooked to a printer to provide a print-out of the results Included in the test apparatus is a weight to apply force to the fiber during the test. Normally the weight is a 100 gram weight which contains a hook for suspending the weight. Other size weights may be used, but require an adjustment in the calculations as shown below .; and (4) Gloves, preferably cotton, for handling the fiber without contaminating the fiber surface.

The sample of the coated fiber to be tested should, at minimum at least 30 meters long. Preferably the fiber to be tested should be conditioned in ambient laboratory conditions of 23±1° C. and 50±5% relative humidity for a period of at least 16 hours prior to testing. The fiber may be conditioned on the reel on which it is received, or the fiber may be wound onto the cylinder and then the wound cylinder and reel of fiber conditioned under the specified conditions. This preconditioning ensures that the results of the test are not affected by varying temperature and humidity, which may affect the COF measured.

The fiber to be tested is wound onto the cylinder starting approximately ¼ to ½ inch from one edge. The end is taped to the cylinder to hold it in place. The cylinder is rotated to wind the fiber onto the cylinder in a close-packed configuration. The winding is stopped when the fiber reaches a point approximately equidistant from the opposite edge as the starting point is from the starting edge. This winding should be done with cotton gloves to ensure that skin oil does not contaminate the surface of the fiber and thus change the result (since skin oil can function as a lubricant). It is convenient to use a winder which has a speed control and can be started and stopped with a foot switch. The speed control is set for a slow speed at which the fiber being wound can be pushed against the already wound fibers using finger pressure to slide the fiber sideways. An adapter which has a hole in one end the size of the winder shaft (and contains set screws to fasten the adapter to the end of the shaft) and the other end of the adapter contains a ¼–20 threaded rod which screws into the end of the cylinder to secure it to the shaft. Care should be taken not to touch the wound fiber with bare fingers while storing it, transporting it, and while mounting it on the test apparatus. The fiber should be wound tightly enough on the cylinder that it cannot be easily moved sideways using finger pressure.

Figure 4:
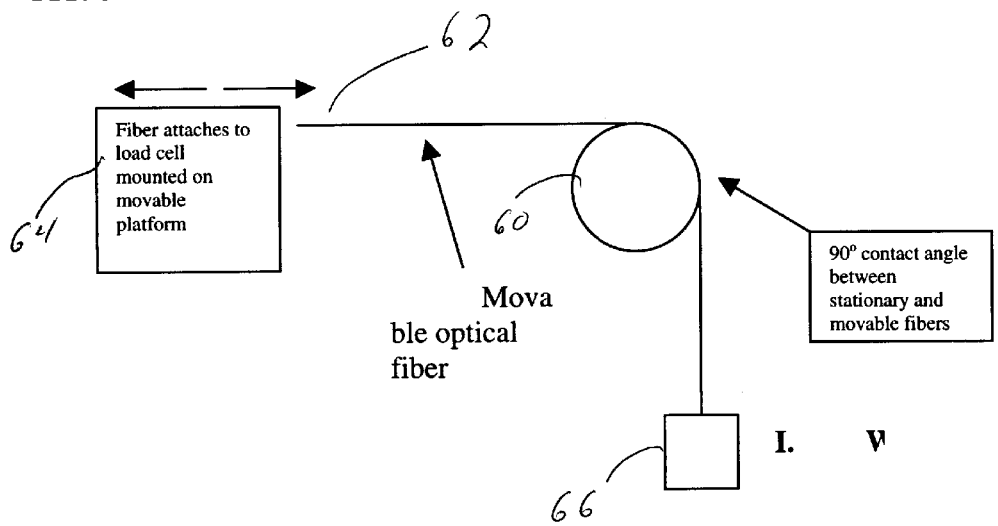
FIG. 4 is a side schematic view of an apparatus for determining fiber to fiber coefficient of friction in accordance with the invention.
Figure 5:
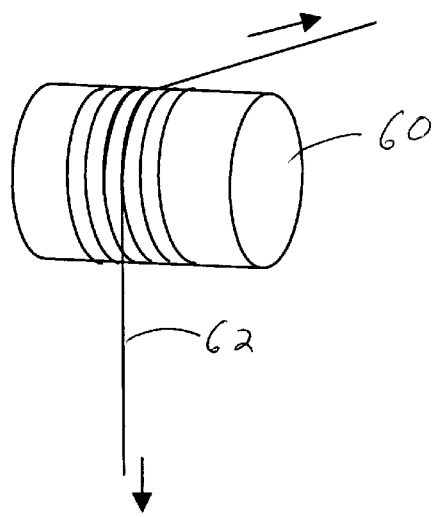
FIG. 5 is a plan view of cylinder and the moving fiber illustrated in FIG. 4.

The wound cylinder of fiber is mounted on the apparatus. One way of mounting the wound cylinder of fiber is shown in FIG. 4. As shown in FIG. 4. The wound cylinder of fiber 60 is stationary. One end of a fiber 62 is attached to a load cell 64 or other device for measuring force, load cell 64 is on a movable platform. It is preferred that fiber 62 is about a one meter sample of the fiber wound on cylinder 60. A weight 66 is attached to a second end of the fiber. Fiber 62 is aligned in contact with cylinder 60 as shown in FIG. 4. Preferably, the contact angle between fiber 62 and the fiber on cylinder 60 is about 90°. It is preferred that the cotton gloves are used in aligned fiber 62 with cylinder 60. Preferably the movable fiber 62 is parallel to the stationary fibers on cylinder 60 and that fiber 62 lies within only one groove created by the stationary fibers, as shown in FIG. 5.

Figure 6:
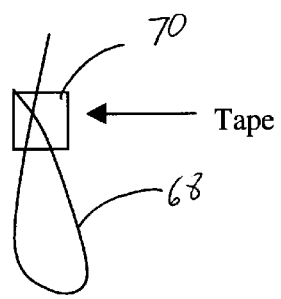
FIG. 6 is a schematic view of one configuration of the movable fiber to attach the weight to the movable fiber.

On the opposite end of fiber 62, make a loop 68 of approximately ½ inch diameter and secure it with masking, or other, tape 70, as shown in FIG. 6. Loop 70 will be used to hold weight 66 when the test is run.

Care is taken to make sure that fiber 62, which moves during the test, lies in the groove formed between two fibers on cylinder 60, that fiber 62 does not cross from one such groove to another and that the fiber on cylinder 60 is tightly wound with adjacent fibers touching such that the moving fiber 62 cannot force adjacent fibers apart and contact the underlying metal cylinder 60. Since adjacent wraps of fiber are what keeps the stationary fiber from sliding sideways during the test, preferably place moving fiber 62 within the central one inch of wound fiber. Placing fiber 62 closer to the edge than this may allow the fibers on cylinder 60 to slip sideways during the test.

When the equipment is set up and the test is ready to be run, then hang weight 66 from loop 68 at the end of fiber 62. Make one last check to ensure that the movable fiber 62 resides in only one groove on the wound cylinder 60. Make sure that weight 66 is not swinging and then start the test.

Start the movable platform so that movable fiber 62 slides along the groove at a constant speed. Measure the force to keep fiber 62 sliding at constant speed. Once movable fiber 62 has slid a total distance of 3 cm, stop the movement of the platform.

If the supporting hook on the weight is too small, movable fiber 62 may break after a couple of minutes under load. If this happens, form another loop in the end of fiber 62. It is advantageous to remove the weight from the end of fiber 62 as soon as movable fiber 62 stops sliding. This prolongs the fiber breaking time to beyond the end of the normal testing. Reverse the slide to its original position.

Once the test is complete, store the data (or whatever your test requires to prepare for testing the next specimen). Remove fiber 62 from the load cell and advance the contact with the load cell at least one inch, and preferably, a bit more. Then move movable fiber 62 to another groove on the wound cylinder. This ensures that the next test utilizes portions of both the movable and stationary fibers which have not already been tested. Resecure fiber 62 to the load cell. Also take care when reattaching fiber 62 to the load cell to secure fiber 62 in a position in line with fiber coming from the wound cylinder 60 so that the fiber is being pulled straight out of the groove on wound cylinder 60. Care in making this alignment prevents moving fiber 62 from jumping from one fiber groove to another, which could give an invalid test. The above procedure can now be used to test the next specimen. Preferably, ten tests are run if sufficient fiber is available.

A force vs. distance trace for a well-behaved sample will appear as shown in the FIG. 7 below.

The static and dynamic COF values are determined using the peak and average forces from the formula below.

$$\mu_s = (\sin \alpha/2 \ln (T_2/T_1))/\beta$$

where $\alpha$=4.189 radians (120° or the angle between sliding and stationary fibers), $\beta$=1.571 radians (90° or the fiber contact angle) and T1=100 g, and $\mu_s$=0.55 In $T_2/T_1$ for our lab setup If the weight used was other than a 100 gram weight, substitute that weight for $T_1$. $T_2$ is the peak or average force measured in the test. If a contact angle other than 90° was used substitute the appropriate value (in radians) in the formula for $\beta$.

Figure 7:
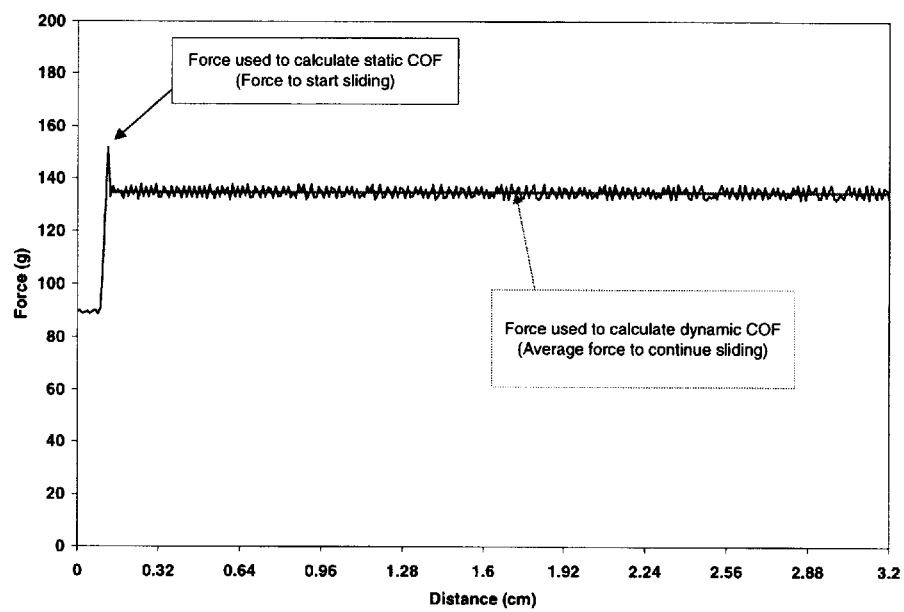
FIG. 7 is a sample plot of the force v. distance curve for a fiber to fiber coefficient sample.

Sometimes, the force vs. distance plot is not as simple and well-behaved as the one shown in FIG. 7. In such a situation as the one shown in FIG. 8, the same procedure is used except that judgment has to be applied to determine where to start and stop when calculating the average force used to determine the dynamic COF value.

Figure 8:
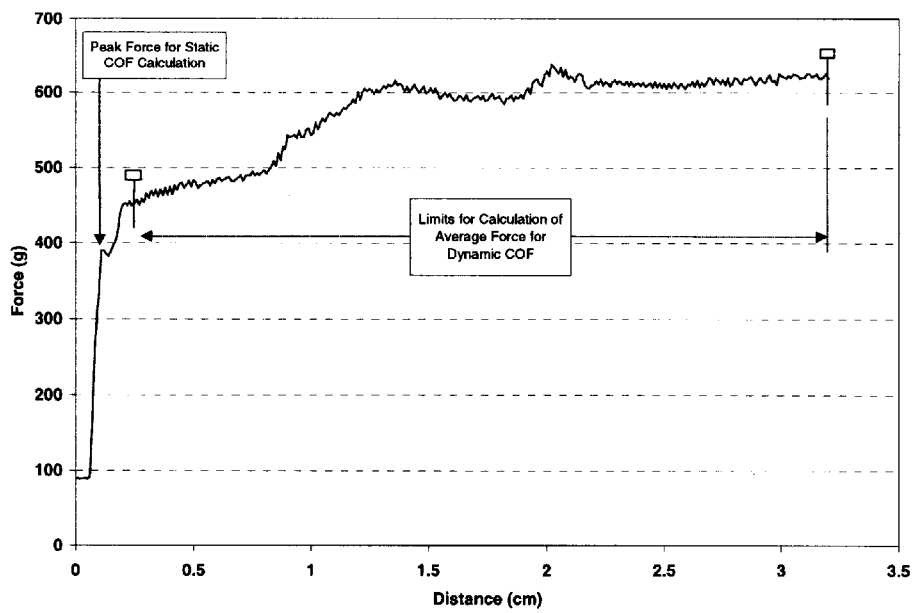
FIG. 8 is a second sample plot of the force v. distance curve for a fiber to fiber coefficient sample.

Note that, in FIG. 8, the peak force in the plot is no longer the force used to calculate the static COF value. The static peak force is taken as that point when the fiber just starts to slide (typically the end of the relatively straight line upwards in force).

This procedure may be used for measuring the COF for contact between the fiber and a bare metal cylinder (such as stainless steel), but the formula used to calculate the COF must be changed to the one below.

$$\mu_s = (\ln T_2/T_1)/\beta$$

where $T_1$, $T_2$, and $\beta$ are defined as above.

Preferably, the reported result is the mean and 95% confidence interval for the mean for both the static and dynamic COF values. Because the calculation involves a logarithm, the upper confidence interval will not be equal the lower confidence interval, typically the lower interval will be slightly larger than the upper interval.

Figure 9:
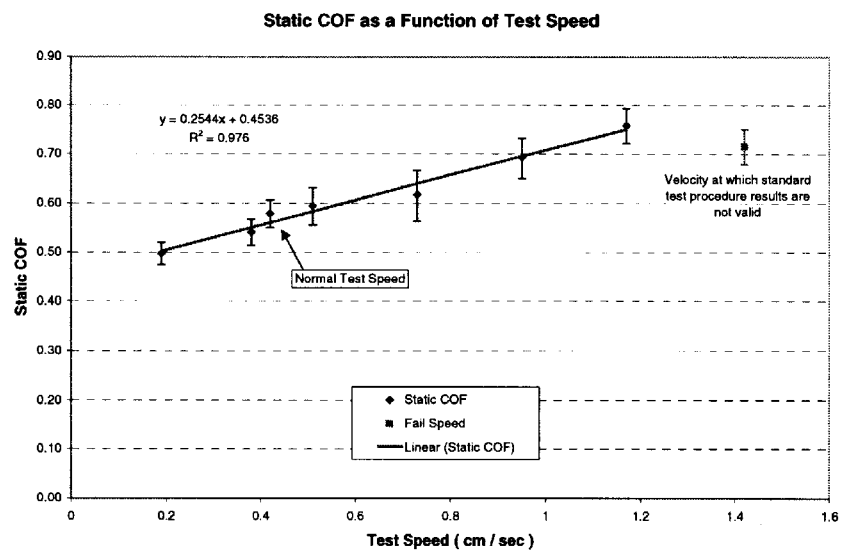
FIG. 9 is a graph of the static fiber to fiber coefficient of friction as a function of test speed.
Figure 10:
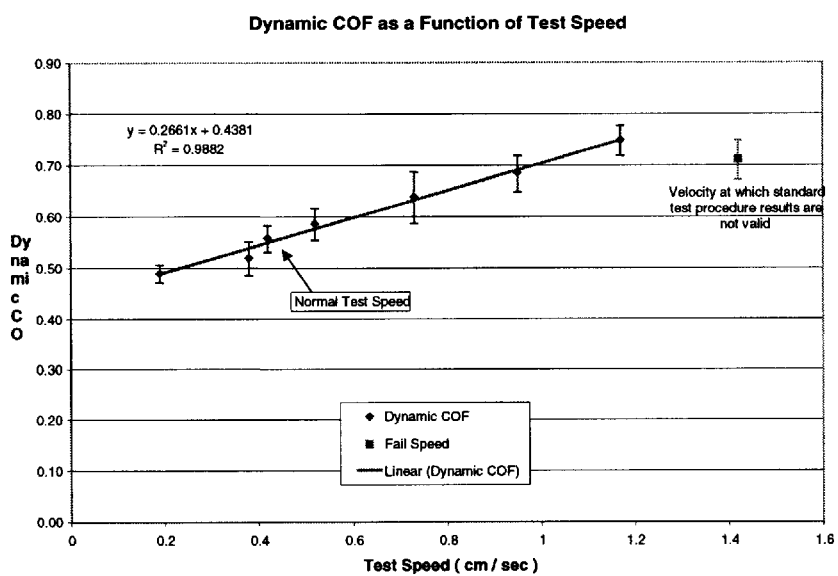
FIG. 10 is a graph of the dynamic fiber to fiber coefficient of friction as a function of test speed.

The speed at which the test is run is historically-based. To evaluate the effect of test speed on the static and dynamic COF values, a fiber coated with a urethane acrylate dual coating system, available from DSM Desotech, Inc. of Elgin, Ill., was tested in a controlled environment where the temperature is controlled to 23±1°C. and the relative humidity is controlled to 50±5%. The secondary coating of the dual coating has a Young's modulus of less about 935 MPa. The fiber selected was SMF-28 from Corning Incorporated of Corning, N.Y. The static COF results are shown in FIG. 9 below and the dynamic COF results are shown in FIG. 10.

As the data above shows, test speed will affect the value of COF obtained with this test. The size of the weight used may also affect the value of the COF calculated from the data. To avoid problems with this factor, a decision was made very early in the testing to use only a 100 gram weight.

The coating composition may be varied to arrive at a coating with the above coefficient of friction properties. In one embodiment, the coefficient of friction of the secondary coating is reduced to no more than the aforementioned limits by the inclusion of a slip agent in the formulation of the secondary coating. Preferred slip agents include an organomodified silicone acrylate (commercially available as Tegorad 2200 from Goldschmidt Chemical Co., (Hopewell, Va.)) or polyethylenepolypropyleneglycol glyceryl ether (commercially available as Acclaim 4220 from Lyondel, formerly known as Arco Chemicals, (Newtowne Square, Pa.)). However, the invention is not limited to the aforementioned slip agents.

It is also preferred that the secondary coating is part of a dual coating system. Optionally, the dual coating system will include a coloring material, such as a pigment or dye, or an additional colored ink coating.

A secondary coating with a Young's modulus of at least about 950 MPa has exhibited reduction in the amount of signal attenuation loss due to microbending in a fiber for a coating composition which consists of about 15% or less of the oligomeric component. High Young's modulus coatings with more than 15% of the oligomeric component have also exhibited improved microbending properties. For coatings with more than about 15 percent of the oligomeric component, suitable oligomers include the oligomers previously cited, preferable oligomers include polyether urethane acrylate or diacrylate oligomers (e.g. BR301 available from Bomar and CN981 available from Sartomer). The oligomer is present in greater than about fifteen (15) weight percent, optionally greater than about twenty-five (25) weight percent, and further optionally up to about forty-five (45) weight percent. The non-low oligomer coating is not limited to only the aforementioned oligomers. Oligomers which may be formulated with other coating ingredients to yield a cured coating having a Young's modulus of at least about 900 MPa may be used to practice the invention.

The coatings further typically include at least one of the aforementioned monomers and one of the aforementioned photoinitiators. The monomer or monomers is typically present in an amount of about forty (40) to about eighty-two (82) weight percent. In the case that the coating is a multiple monomer coating, each monomer is present in an amount of at least about five (5) weight percent and up to about seventy (70) weight percent. The photoinitiator is preferably present in an amount up to about six (6) weight percent. The more than about 15% oligomer coating may include the other additives as described with respect to the coating with up to about 15% of the oligomer in the total formulation, which includes oligomers, monomers, etc.

Another aspect of the present invention relates to a method of making an optical fiber of the present invention. Basically, this method can be performed by standard methods with the use of a composition of the present invention.

Briefly, the process involves fabricating the glass fiber (core 12 and cladding layer 14), applying a primary coating composition to the glass fiber, polymerizing the primary coating composition to form the primary coating material 16, applying a secondary coating composition to the coated glass fiber, and polymerizing the secondary coating composition to form the secondary coating material 18. Optionally, the secondary coating composition can be applied to the coated fiber before polymerizing the primary coating composition, in which case only a single polymerization step is employed.

The core and cladding layer may be typically produced in a single operation or multi-step operation by methods which are well known in the art. Suitable methods include: the double crucible method as described, for example, in Midwinter, *Optical Fibers for Transmission*, New York, John Wiley, pp. 166–178 (1979), which is hereby incorporated by reference; rod-in-tube procedures; and doped deposited silica processes, also commonly referred to as chemical vapor deposition ("CVD") or vapor phase oxidation. A variety of CVD processes are known and are suitable for producing the core and cladding layer used in the optical fibers of the present invention. They include external CVD processes (Blankenship et al., "The Outside Vapor Deposition Method of Fabricating Optical Waveguide Fibers," *IEEE J. Quantum Electron.*, 18:1418–1423 (1982), which is hereby incorporated by reference), axial vapor deposition processes (Inada, "Recent Progress in Fiber Fabrication Techniques by Vapor-phase Axial Deposition," *IEEE J. Quantum Electron.* 18:1424–1431 (1982), which is hereby incorporated by reference), and modified CVD or inside vapor deposition (Nagel et al., "An Overview of the Modified Chemical Vapor Deposition (MCVD) Process and Performance," *IEEE J. Quantum Electron.* 18:459–476 (1982), which is hereby incorporated by reference).

The primary and secondary coating compositions are coated on a glass fiber using conventional processes, for example, on a draw tower.

The glass fibers may be drawn from a specially prepared, cylindrical preform which has been locally and symmetrically heated to a temperature sufficient to soften the glass, e.g., of about 2000° C. for a silica glass. As the preform is heated, such as by feeding the preform into and through a furnace, a glass fiber is drawn from the molten material. The primary and secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and uncured) coating composition on the glass fiber to ultraviolet light, actinic radiation, microwave radiation, or electron beam, depending upon the nature of the coating composition(s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,581,165 to Rannell et al., which is hereby incorporated by reference. Of course, the primary coating composition can be applied and cured to form the primary coating material 16, then the secondary coating composition(s) can be applied and cured to form the secondary coating material 18.

Still another aspect of the present invention relates to a fiber optic ribbon. The ribbon includes a plurality of substantially planar, substantially aligned optical fibers and a matrix encapsulating the plurality of optical fibers. The matrix is the cured product of a composition of the present invention.

Figure 2:
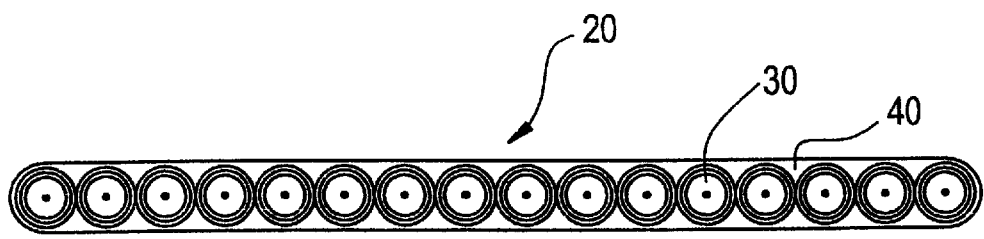
FIG. 2 is a cross-sectional view of a fiber optic ribbon of the present invention.

One embodiment of this aspect of the present invention is illustrated in FIG. 2. As shown there, fiber optic ribbon 20 of the present invention includes a plurality of single or multi-layered optical fibers 30 substantially aligned relative to one another in a substantially planar relationship and encapsulated by matrix 40. By substantially planar, it is intended that optical fibers 30 are not displaced from a common plane by a distance of more than about one-half the diameter thereof. By substantially aligned, it is intended that the optical fibers 30 are generally parallel and co-planar with other optical fibers along the length of the fiber optic ribbon 20. In FIG. 2, the fiber optic ribbon 20 contains sixteen (16) optical fibers 30; however, it should be apparent to those skilled in the art that any number of optical fibers 30 (e.g., two or more) may be employed to form fiber optic ribbon 20 disposed for a particular use.

The fiber optic ribbons of the present invention may be encapsulated by the matrix 40 in any known configuration (e.g., edge-bonded ribbon, thin-encapsulated ribbon, thick-encapsulated ribbon, or multi-layer ribbon) by conventional methods of making fiber optic ribbons.

Basically, the fiber optic ribbon is prepared by standard methods using the composition of the present invention. For example, upon alignment of a plurality of substantially planar optical fibers, the composition of the present invention can be applied and cured according to the methods of preparing optical fiber ribbons as described in U.S. Pat. No. 4,752,112 to Mayr and U.S. Pat. No. 5,486,378 to Oestreich et al., which are hereby incorporated by reference.

Figure 3:
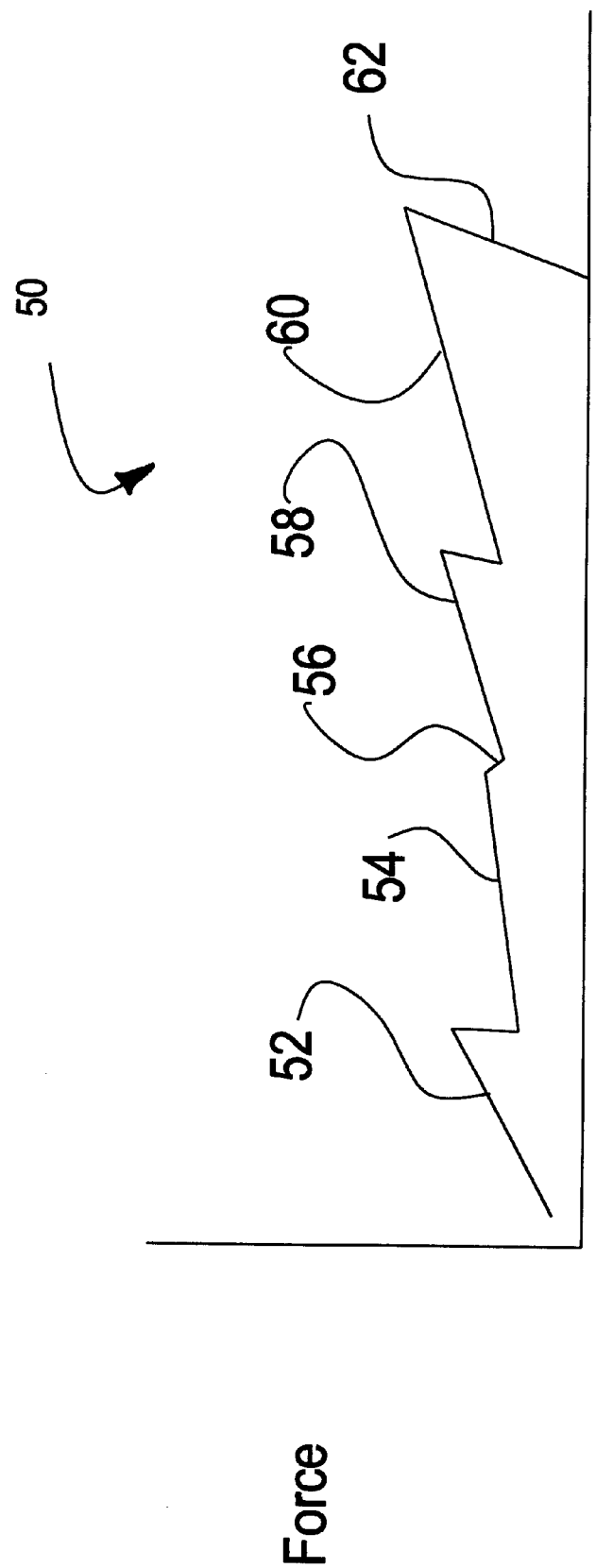
FIG. 3 is a schematic representation of the movement of a fiber that has exhibited slip-stick behavior.

FIG. 3 is diagram of the movement of the fiber that undergoes "slip-stick" behavior, generally designated 50. A fiber exhibits "slip-stick" behavior during winding or unwinding onto a spool when a top fiber has started to move at a steady state relative a lower section of fiber on the spool and then the fiber stops moving. Next the fiber will start to moving again and then the movement stops. This pattern of the fiber moving and then stopping repeatedly is "slip-stick" behavior.

In terms of FIG. 3, section 52 represents the initial force necessary to start movement of the fiber. Section 54 represents the movement of the fiber, sliding. Section 56 represents the fiber sticking and movement ending. Section 58 represents a force necessary to initiate movement of the fiber again. Section 60 represents the sliding of the fiber and section 62 represents the sticking of the fiber and the ending of sliding of the fiber. One cause of "slip-stick" is regions of high COF adjacent regions of low COF. One cause of the regions of differing COF is regions of fully cured coating adjacent regions of non-fully cured coating. "Slip-stick" may cause problems such as deforming the coating on the fiber or varying the wind tension at which the coated fiber is wrapped around the spool. Thus, it is desirable to eliminate "slip-stick".

EXAMPLES

The following examples are provided to illustrate embodiments of the present invention, but they are by no means intended to limit its scope.

Example 1—Preparation of Secondary Coatings

A number of compositions of the present invention were prepared with the components listed in Table 1 below using commercial blending equipment. The oligomer and monomer components were weighed and then introduced into a heated kettle and blended together at a temperature within the range of from about 50° C. to 65° C. Blending was continued until a homogenous mixture was obtained. Next, the photoinitiator was weighed and introduced into the homogeneous solution while blending. Finally, any additives were weighed and then introduced into the solution while blending. Blending was continued until a homogeneous solution was again obtained.

After thoroughly blending, the solution was tested for its viscosity at 25° C. and 45° C., and the solution was examined under optical microscope for the presence of particles, crystals, and phase separation.

TABLE 1

Composition Formulations

| | Oligomer | wt % | Monomer(s) | wt % | Photoinitiator | wt % | Additive(s) | pph |
|---|---|---|---|---|---|---|---|---|
| A | BR301 | 10% | Photomer 4028 | 87% | Irgacure 1850 | 3% | Irganox 1035 | 0.5 |
| B | KWS4131 | 10% | Photomer 4028 | 87% | Irgacure 1850 | 3% | Irganox 1035 | 0.5 |
| C | KWS4131 | 10% | Photomer 3016<br>Photomer 4028 | 5%<br>82% | Irgacure 1850 | 3% | Irganox 1035 | 0.5 |
| D | KWS4131 | 10% | Photomer 4028<br>Photomer 3016 | 82%<br>5% | Irgacure 184<br>Irgacure 819 | 1.5%<br>1.5% | Irganox 1035 | 1.0 |
| E | BR301 | 10% | Photomer 4028 | 87% | Irgacure 1850 | 3% | Irganox 1035<br>Tegorad 435 | 1.0<br>0.25% |
| F | BR301 | 10% | Photomer 4028 | 87% | Irgacure 1850 | 3% | Irganox 1035<br>Tegorad 2200 0.25% | 0.5 |
| G | BR301 | 10% | Photomer 4028 | 87% | Irgacure 1850 | 3% | Irganox 1035<br>Polyol 8200 | 0.5<br>0.25% |
| H | BR301 | 10% | Photomer 4028 | 87% | Irgacure 1850 | 3% | Irganox 1035<br>Polyol 4220 | 0.5<br>0.25% |
| I | BR301 | 10% | Photomer 4028 | 87% | Irgacure 1850 | 3% | Irganox 1035<br>Coatosil 3503 0.25% | 0.5 |
| J | BR301 | 10% | Photomer 4028 | 87% | Irgacure 1850 | 3% | Irganox 1035<br>Coatosil 3505 0.25% | 0.5 |
| K | BR301 | 10% | Photomer 4028 | 87% | Irgacure 1850 | 3% | Irganox 1035<br>Tegorad 220 | 0.5<br>0.5% |
| L | BR301 | | Photomer 4028 | 87% | Irgacure 1850 | 3% | Irganox 1035<br>Polyol 4200 | 0.5<br>0.25% |

Film samples of the numerous ones of the above coating compositions were prepared and the film to film COF was determined for each sample.

| Coating Comp. | Film to Film COF | Attenuation OTDR Results @ 1550 nm | Attenuation OTDR Results @ 1300 nm | Young's Modulus** MPa |
|---|---|---|---|---|
| A | 0.44–0.47 | >0.23 | 0.34–0.36 | Approx. 1300 |
| B | 0.37–0.39 | 0.19–0.20 | 0.33–0.34* | Approx. 1200 |
| C | 0.33–0.37 | 0.20–0.21 | 0.32–0.34 | About 1235 |
| D | 0.37–0.40 | 0.19–0.21 | NA | About 1279 |
| E | Poor Compatibility | NA | NA | |
| F | 0.17–0.20 | NA | NA | About 1125 |
| G | Poor Compatibility | NA | NA | |
| H | 0.29–0.33 | NA | NA | |
| I | 0.25–0.28 | NA | NA | |
| J | Poor Compatibility | NA | NA | |
| L | NA | NA | NA | About 1199 |

*1300 OTDR measured at 1310 nm and not 1300 nm
**Young's modulus measured in accordance with ASTM 882-97

The film to film COF was determined in accordance with the following procedure. A 10 mil film was cast on a 15.25 cm. by 30.5 cm glass plate as the bottom (sled) plate and cured on the UV Fusion system with a UV dose of about 1.60 joules per square centimeter. The plate was given an additional two curing passes to ensure a full cure for 10 mil film. The process was repeated, if necessary, until a defect free surface was produced. Films were cast on smaller (5 cm. by 8 cm.) glass plate for the top (load cell) plates in order to fit within the 8 cm. width of the bottom plate film. The small plates were cut from the center of a larger plates with the excess glass serving as a template for casting. In order to produce the three plates necessary for the repeatability of COF testing, six plates are cast with 5 mil coating and cured with the three best candidates chosen for testing. Excess film is then trimmed from the edges of the small plates with a razor blade and given an additional curing pass to ensure full cure. Once the large plate and three small plates have been cast and cured with defect free film, they are wiped with acetone to remove any residue or particles that may effect friction testing and placed in a dessicator overnight to dry.

Prior to taking the initial COF measurements, it is necessary to lightly sand the edges of the small top plates on all four sides to remove any rough edges or imperfections caused by trimming the excess film. In this procedure, a small strip of 600 grit sandpaper is carefully moved along the film to glass interface at a 45 degree angle with the film side facing up. The effect of this procedure is the "rounding" of the edges, like the tip of a ski, to eliminate any edge influence on friction except the actual film to film interface. Before a COF measurement is taken, both the top and bottom plates are cleaned with a Staticmaster brush to remove small film particles produced by the sanding and other particles that may have clung to the film surfaces.

To test for the coefficient of friction of cured secondary films, the large glass plate with film side facing up is secured to the moving stage (sled) with a small C-clamp at each end. One of the smaller plates, with film facing down, is taped on the non-film side to a L-bracket which is connected to the load cell with a flexible wire. Because of the relatively small mass (38.65 grams) of the small top plate, it was necessary to add a brass weight (87.62 grams) to the top plate to bring the load cell reading up to a comfortable and usable range (total weight=126.27 grams). The moving (bottom) film moves along the interface of the stationary (top) film attached to the load cell while the load cell measures the resistance (friction) between the two films. The sled travels at a constant rate of 15 cm. per minute, with a maximum travel distance of about 16.5 cm. The load cell dial measures up to 500 grams resistance in 5 gram intervals, with two independent gauge needles that measures the static (friction obtained from the initial movement of test samples) and the dynamic (friction obtained while the test samples were in motion) COF values. For each of the three top plates, 20 kinetic measurements are taken for friction with the edges sanded after every fifth measurement. The aim of the additional edge sanding during the friction measurements is to achieve the lowest possible average value for each of our nine formulations as the accepted COF value where:

$$COF = \frac{\text{Avg. load cell value (g)}}{126.27 \text{ g}}$$

Also, both top and bottom plates are cleaned with the Staticmaster brush after each COF measurement to eliminate any debris from the film surfaces that may effect the consistency of the load cell reading. In order for a COF value to be accepted as accurate, all three top plates must measure within 5% difference to the average value in friction after 20 measurements. If not, the plates are recast and repeated or the formulation is adjusted accordingly and the test repeated.

| Coating Composition/ Fiber # | Static Fiber to Fiber COF | Dynamic Fiber to Fiber COF | Attenuation OTDR @ 1500 nm 0 hr/48 hr | Attenuation OTDR Results @ 1300 nm 0 hr/48 hr |
| --- | --- | --- | --- | --- |
| A/1 | 0.75 | 0.75 (exhibited slip-stick) | 0.54/0.45 | 0.35/0.33 |
| K/2 | 0.63 | 0.57 (did not exhibit slip-stick) | 0.215/NA | 0.343/NA |
| L/3 | 0.67 | 0.68 (did not exhibit slip-stick) | 0.23/0.22 | 0.34/0.34 |
| I/4 | 0.70 | 0.64 (did not exhibit slip-stick) | 0.21/0.21 | 0.33/0.33 |

With respect to each coated fiber test, the type of fiber used was SMF-28 available from Coming Incorporated of Coming, N.Y. The length of each fiber sample was at least about 1 km, preferably at least about 2 km. The primary coating comprised either (1) 52 wt. % of BR 3731 a aliphatic urethane acrylate oligomer, 45 wt. % of Photomer 4003 an ethoxylated nonylphenol monoacrylate, 3 wt. % of Irgacure 1850 a photoinitiator, 1 pph of Irganox 1035 an anti-oxidant, 2 pph of Bis(trimethoxysilylethyl) benzene, an adhesion promoter, and 0.5 pph of Tego Rad 2200 or (2) 52 wt. % of BR 3731 a aliphatic urethane acrylate oligomer, 20 wt. % of Photomer 4003 an ethoxylated nonylphenol monoacrylate, 25% of Tone M-100 a caprolactone acrylate, 3 wt. % of Irgacure 1850 a photoinitiator, 1 pph of Irganox 1035 an anti-oxidant, 2 pph of Bis(trimethoxysilylethyl) benzene, an adhesion promoter, and 0.5 pph of Tego Rad 2200. Each of the primary coating compositions was prepared as set forth in U.S. patent application Ser. No. 09/301,814, filed Apr. 29, 1999, to Fewkes et al., which is hereby incorporated by reference. Primary coating 2 was applied to fibers L/3 and I/4 of table 3, all of other coated optical fibers included primary coating 1.

A PK-Bench 2500, available from Photon Kinetics of Beaverton, Oreg., was used to determine the OTDR results. The spool used had a barrel with an outer diameter of no more than about 6".

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. An optical fiber coating composition comprising:
   a UV curable coating composition, said composition when cured having a Young's modulus of at least about 950 MPa and a film to film coefficient of friction of less than about 0.44.

2. The optical fiber coating composition according to claim 1 wherein said coating composition further comprises at least one component selected from the group consisting of surfactants, surface agents, slip additives, waxes, micronized polytetrafluoroethylene, and combinations thereof.

3. The optical fiber coating composition according to claim 2 wherein said component comprises a polymer based on a polyalkylsiloxane.

4. The optical fiber coating composition according to claim 1 wherein said film to film coefficient of friction is about 0.40 or less.

5. The optical fiber coating composition according to claim 1 wherein said coating composition comprises less than about 10% of an oligomeric component.

6. The optical fiber coating composition according to claim 1 wherein said coating composition comprises 9% or less of an oligomeric component.

7. The optical fiber coating composition according to claim 1 wherein said Young's modulus is at least about 1000 MPa.

8. A coated optical fiber comprising;
   an optical fiber which comprises at least a core and a cladding; and
   a cured coating encircling said optical fiber, said coating having a Young's modulus of at least about 950 MPa, a film to film coefficient of friction of less than about 0.44, and a thickness of more than about 5 microns.

9. The coated optical fiber according to claim 8 wherein said thickness of said coating is about 45 microns or less.

10. The coated optical fiber according to claim 8 wherein said film to film coefficient of friction is about 0.40 or less.

11. The coated optical fiber according to claim 8 wherein said coating further comprises at least one component selected from the group consisting of surfactants, surface agents, slip additives, waxes, micronized polytetrafluoroethylene, and combinations thereof.

12. The coated optical fiber according to claim 8 wherein a fiber to fiber coefficient of friction of said coating is no more than about 0.74, said fiber to fiber coefficient of friction being measured at a speed of about 0.423 cm/sec and a weight of about 100 grams.

13. The coated optical fiber according to claim 12 wherein said fiber to fiber coefficient of friction of said coating is no more than about 0.70.

14. The coated optical fiber according to claim 8 further comprising a spool having a barrel, said fiber being wrapped around said barrel at a tension of no more than about 75 grams, the fiber having been wrapped around the barrel at a speed of at least about 20 m/s, wherein said fiber exhibits an attenuation of about 0.40 dB/km or less at a wavelength of about 1550 nm.

15. The optical fiber according to claim 14 wherein said attenuation is no more than about 0.23 dB/km.

16. The coated optical fiber according to claim 8 further comprising a spool having a barrel, said fiber being wrapped around said barrel at a tension of no more than about 75 grams, said fiber having been wrapped at a speed of at least about 20 m/s wherein said fiber exhibits an attenuation of about 0.34 dB/km or less at a wavelength of about 1300 nm, when said fiber has been wrapped around said spool for a time period of less than 48 hours.

17. The coated optical fiber according to claim 8 wherein said Young's modulus is at least about 1000 MPa.

18. A method of making a coated optical fiber comprising the steps of:

coating an optical fiber with an UV curable coating composition, and curing the composition to yield a cured coating having a Young's modulus of at least about 950 MPa, a film to film coefficient of friction of less than about 0.44, and a thickness of greater than about 5 microns.

19. A coated optical fiber comprising:

an optical fiber comprising a core encompassed by a cladding; and a cured coating encompassing said cladding, said coating having a Young's modulus of at least about 400 MPa, a fiber to fiber coefficient of friction of less than about 0.74, said fiber to fiber coefficient of friction being measured at a speed of about 0.423 cm/sec and with a weight of about 100 grams, and a thickness of more than about 5 microns.

20. The coated fiber according to claim 19 wherein said coefficient to friction is no more than about 0.68.

21. The coated fiber according to claim 19 further comprising a primary coating adjacent to said fiber.

22. The coated fiber according to claim 8 further comprising a primary coating adjacent to said fiber.

23. A coated optical fiber comprising:

an optical fiber including a core encompassed by a cladding;

a primary coating on the surface of the optical fiber; and a secondary coating surrounding the primary coating, the secondary coating having a Young's modulus of at least about 950 MPa, a film to film coefficient of friction of less than about 0.44, and a thickness of greater than about 5 microns.

24. The coated optical fiber of claim 23 wherein the secondary coating has a fiber to fiber coefficient of friction of less than about 0.74, said fiber to fiber coefficient of friction being measured at a speed of about 0.423 cm/sec and with a weight of about 100 grams.

25. The coated optical fiber of claim 23 wherein the secondary coating is formed on the surface of the primary coating.

\* \* \* \* \*